Patented June 7, 1932

1,861,950

UNITED STATES PATENT OFFICE

JOHN H. BUCHANAN AND JULIAN H. TOULOUSE, OF AMES, IOWA, ASSIGNORS TO AMERICAN BOTTLERS OF CARBONATED BEVERAGES, A CORPORATION OF THE DISTRICT OF COLUMBIA

PROCESS OF CLARIFYING AND RECOVERING CAUSTIC SODA CONTENT OF DETERIORATED ALKALINE SOLUTIONS

No Drawing.   Application filed September 6, 1928.   Serial No. 304,386.

The purpose of this invention is to provide a simple and inexpensive means for renewing deteriorated alkaline washing solutions after a period of use in the washing of bottles, particularly those in which milk and flavored soda water, soft drinks, or similar beverages are sold.

The washing solutions so used consist essentially of caustic soda to which has been added sodium carbonate, trisodium phosphate, or other possible compounds. Caustic soda, however, is the principal agent responsible for the cleansing and sterilization of the bottles, and in order to properly cleanse those containers the solution must at all times be maintained at a definite caustic strength. Unless renewed after a period of use, it will have deteriorated and become unfit for further use due to various factors resulting from the washing process, as follows:

(1st) The carbon dioxide of the air will be taken up very rapidly by the caustic solution, thus depleting the caustic alkalinity and building up the carbonate.

(2nd) The empty used bottles being washed ordinarily contain or have adhering to them a certain amount of solution containing acid, sugar, etc. as well as labels, color, paper, glue, starch, and other refuse matter. The tendency of the acid is to neutralize a certain amount of the caustic with the formation of the sodium salts of the fatty acids. The sugar will caramelize due to the alkali and heat employed in the washing process. Color and paper from labels, glue, starch, etc., will be deposited from the bottles in the washing solution.

This deterioration in the solution due to its use may therefore be summarized as a loss in causticity, a building up of the carbonate, formation of salts of fatty acids, and the deposition of dirt, glue, starch, paper, and other matter removed from the bottles into the solution.

As a practical matter, therefore, this deterioration requires that the entire solution be discarded very often and a new quantity of the solution used.

Through the use of our invention the used solution is clarified and its caustic strength increased to the desired point, the discarding of the solution being thereby avoided with the consequent saving in labor and materials, ordinarily expended in the preparation of a new quantity of solution.

The process is based upon the following reactions:

(a) between sodium carbonate and lime, which results in the production of caustic soda, viz., lime plus sodium carbonate equals caustic soda plus calcium carbonate.

(b) between the salts of fatty acids formed and the lime, resulting in the formation of the calcium salts of fatty acids and caustic soda, the calcium salts of fatty acids being precipitated because of their insolubility, viz., lime plus soap equals calcium soap plus caustic soda.

(c) between the sugar and the lime, insoluble calcium salts of sugar being formed and precipitated, viz., lime plus sugar equals calcium sucrate.

(d) glue and certain other constituents are either precipitated directly by the lime or are carried down mechanically by the precipitation of the calcium carbonate.

(e) dirt and other impurities will be mechanically carried down out of solution due to the formation of calcium carbonate.

The process therefore results in the formation of caustic soda by the action of lime upon the sodium carbonate and on the salts of fatty acids whereby the causticity of the solution is materially increased, as well as in the elimination of the calcium salts of fatty acids (soaps), sugar, coloring matters, glue, starch, dirt, paper, and other refuse matter which renders the solution clear and free therefrom.

A description of the process follows:

The deteriorated solution, which may be cold or at any temperature up to the boiling point of the liquid, is pumped from the washing machine into a tank of sufficient size depending upon the quantity of the solution to be treated.

After being pumped into the tank, a force of live steam is injected through holes in pipes laid in the bottom of the tank, forming jets of steam upwardly through the solution.

Not only is the steam helpful in raising the temperature of the solution to the desired point, which is 180° F. but the steam jets form a simple and effective method of agitating the solution without mechanical means, and were found to force the lime into solution and cause the completed reaction more quickly than old methods of heating and agitation, as well as to precipitate the organic matter so efficiently and so rapidly that filtration of the treated solution is unnecessary after a short settling period.

Lime is added directly to the solution when it reaches the temperature of 180° F. thereby raising the temperature from that point to very near the boiling point.

The quantity of lime to be added is determined by the percentage of sodium carbonate in the solution and by the percentage of caustic soda desired in the solution after the reaction is complete, as follows:

The amounts of sodium carbonate and sodium hydroxide in the waste solution are determined by the usual chemical procedure. Substantially 56 parts of lime must be used for each 106 parts of sodium carbonate present if the maximum amount of sodium carbonate is to be recovered as sodium hydroxide. If only a portion of the total sodium carbonate present in the solution is to be recovered as sodium hydroxide substantially 56 parts of the lime must be used for each 80 parts of sodium hydroxide to be recovered.

For example, if 100 pounds of solution contains 1 pound (1%) of sodium hydroxide and 2.5 pounds (2.5%) of sodium carbonate, and it is desired to recover all of the sodium carbonate as sodium hydroxide then $2.5 \times 56/106$ or 1.32 pounds (1.32%) of lime must be added. This is equivalent to adding .5283 parts of lime for each part of sodium carbonate.

If, on the other hand, it is desired to increase the strength of the solution only to 2.5% by weight of sodium hydroxide, then 56/80 (2.5-1) or 1.05 pounds (1.05%) of lime must be added. This is equivalent to adding .70 parts of lime for each part of sodium hydroxide to be recovered.

After the agitation of the solution during heating ceases, the calcium carbonate formed in the first reaction will settle, and in the process of settling will carry suspended matter such as dirt, paper, starch, etc. down with it, thereby clarifying the solution. This settling and clarification, as well as the recovery of caustic soda in the solution through use of this process, will take place in a comparatively short time. If carried out at night the renewed solution will be available the next morning for use, and can be pumped back into the bottle-washing machine ready for use, the sediment remaining in the tank.

Having thus described our invention, we claim:

1. The process of causticizing and clarifying alkaline solutions containing acid, sugar, and refuse matter comprising concurrent heating and agitation of the solution by injecting steam thereinto, adding lime to the heated solution at 180° F., and allowing precipitation of the solids.

2. The process of causticizing and clarifying alkaline solutions containing acid, sugar, and refuse matter comprising concurrent heating and agitation of the solution by injecting a plurality of jets of steam thereinto, adding lime to the heated solution at 180° F., and allowing precipitation of the solids.

3. The process of causticizing and clarifying alkaline solutions containing acid, sugar, and refuse matter comprising concurrent heating and agitation of the solution by injecting steam thereinto, adding lime to the heated solution, and allowing precipitation of the solids.

4. The process of causticizing and clarifying deteriorated alkaline solutions comprising concurrent heating and agitation of the solution by injecting a plurality of jets of steam thereinto, adding lime to the heated solution, and allowing precipitation of the solids.

5. The process of causticizing and clarifying alkaline solutions containing acid, sugar, and refuse matter, comprising concurrent heating and agitation of the solution by injecting a plurality of jets of steam thereinto, adding lime to the heated solution, and allowing precipitation of the solids.

6. The process of causticizing and clarifying deteriorated alkaline solutions comprising concurrent heating and agitation of the solution by injecting steam thereinto, adding lime to the heated solution at 180° F. and allowing precipitation of the solids.

7. The process of causticizing and clarifying deteriorated alkaline solutions comprising concurrent heating and agitation of the solution by injecting a plurality of jets of steam thereinto, adding lime to the heated solution at 180° F. and allowing precipitation of the solids.

8. The process of causticizing and clarifying deteriorated alkaline solutions comprising concurrent heating and agitation of the solution by injecting steam thereinto, adding lime to the heated solution, and allowing precipitation of the solids.

JOHN H. BUCHANAN.
JULIAN H. TOULOUSE.